(12) United States Patent
Price (10) Patent No.: US 9,996,587 B1
(45) Date of Patent: Jun. 12, 2018

(54) SYSTEMS AND METHODS FOR OBTAINING SEGMENT SPECIFIC FEEDBACK

(75) Inventor: Roy F. Price, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1242 days.

(21) Appl. No.: 12/890,486

(22) Filed: Sep. 24, 2010

(51) Int. Cl.
*G06F 17/30* (2006.01)

(52) U.S. Cl.
CPC .............................. *G06F 17/3053* (2013.01)

(58) Field of Classification Search
CPC .................................................. G06F 17/3053
See application file for complete search history.

(56) References Cited

U.S. PATENT DOCUMENTS

| | | | |
|---|---|---|---|
| 7,310,612 B2 | 12/2007 | McQueen, III et al. | |
| 7,433,832 B1* | 10/2008 | Bezos | G06Q 10/10 705/26.8 |
| 7,664,669 B1 | 2/2010 | Adams et al. | |
| 7,716,376 B1 | 5/2010 | Price et al. | |
| 8,345,068 B1 | 1/2013 | Goodwin et al. | |
| 2002/0178057 A1* | 11/2002 | Bertram et al. | 705/14 |
| 2003/0194690 A1* | 10/2003 | Wessner et al. | 434/350 |
| 2006/0190961 A1* | 8/2006 | Handel et al. | 725/24 |
| 2008/0015925 A1* | 1/2008 | Sundaresan | 705/10 |
| 2009/0144272 A1* | 6/2009 | Adarsh et al. | 707/5 |
| 2009/0177689 A1* | 7/2009 | Song et al. | 707/103 R |
| 2010/0042618 A1* | 2/2010 | Rinearson et al. | 707/5 |
| 2010/0159438 A1* | 6/2010 | German et al. | 434/433 |
| 2011/0254911 A1* | 10/2011 | Neuenschwander | G06F 17/3089 348/14.03 |

OTHER PUBLICATIONS

Edward Olson, "Differences: Harry Potter books", 2005, Edward Olson.*
U.S. Appl. No. 11/277,688, filed Mar. 28, 2006, 56 pages.
U.S. Appl. No. 12/702,842, filed Feb. 9, 2010, 54 pages.

* cited by examiner

*Primary Examiner* — Rehana Perveen
*Assistant Examiner* — Huen Wong
(74) *Attorney, Agent, or Firm* — Knobbe, Martens, Olson & Bear, LLP (57) ABSTRACT

Systems and methods are provided for obtaining feedback associated with specific segments of a work. In some embodiments, a content provider may make one or more segments of the work available to commentators to provide feedback associated with a particular segment. The feedback may include ratings and/or comments. In some embodiments, feedback scores may be calculated using the feedback. Alternatively or additionally, content providers and/or other commentators may evaluate feedback provided by commentators. These evaluations may be used to calculate a commentator reputation score. Some feedback scores may be based at least in part on commentator reputation scores. In some embodiments, comparisons of feedback may be generated. For example, the comparisons may be based at least in part on feedback associated with one or more segments that is filtered based on demographic criteria that divide commentators into groups.

21 Claims, 10 Drawing Sheets

SYSTEMS AND METHODS FOR OBTAINING SEGMENT SPECIFIC FEEDBACK

BACKGROUND

Content providers often desire feedback from commentators on works in progress. For example, a writer may want feedback on a screenplay that she is developing. One way content providers may obtain feedback is to distribute a work via a network and obtain feedback in the form of ratings and/or comments. While this may provide the content creator with feedback associated with an entire work, it may be difficult to obtain feedback on specific segments of the work. Content providers may find feedback about specific segments to be more helpful than feedback about the entire work, in order to focus in on particular parts of a work to revise, such as a scene or a beat of a screenplay. In addition, the content creator may obtain a large amount of feedback data associated with a work, without the tools to efficiently generate detailed analysis of the feedback data. Some feedback may be of greater interest to the content creator than other feedback, yet it may be hard to account for the feedback that is of greater interest when aggregating all of the feedback, especially feedback for specific segments of a work.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to obtaining feedback on discrete segments of a work from commentators. The systems described herein may generally be referred to as a mass content feedback tool. The mass content feedback tool enables content providers to provide at least a portion of a work to commentators in discrete segments. A work may include a complete unit of text, data, sound recordings, images, video, and/or software. For example, a work may be a screenplay that includes a story outline divided into beats, which may be referred to as a beat outline. Beats may represent specific units of a screenplay that move the progress of a story forward. For example, a beat may represent a portion of the screenplay from one pause to another pause. Using the mass feedback tool, a content provider, such as a writer, may make one or more individual beats available to commentators to provide feedback associate with a particular beat. The writer may also divide the story outline into segments of a different granularity, such as scenes or chapters, and present those segments to commentators via the mass feedback tool to obtain feedback specific to those segments. In some instances, feedback may be obtained for a work divided into segments of different granularity.

As noted above, feedback for one or more segments may be obtained from a commentator. A commentator may be anyone who provides feedback associated with at least a portion of a work. Content creators, editors, critics, and/or fans are non-limiting examples of commentators. The feedback provided by commentators about each segment may include comments, ratings and/or other feedback. Comments may include any verbal reaction or suggestion to a segment. In some instances, comments may include text entered by a commentator. Ratings may include a general impression of a segment. For example, a rating may be a numerical value (e.g., 65/100) or a qualitative rating (e.g., "exceptional").

Content providers may view feedback associated with each segment of the work, for example, via a user interface. Content providers may include anyone who provides content to the mass content feedback tool including without limitation content creators, agents, editors, and publishers. Depending on how the work is divided into discrete segments, the content provider may customize the level of granularity of the feedback. Feedback data including feedback scores may be presented to a content provider via a user interface. The user interface may enable the content provider to filter feedback data associated with one or more discrete segments. The content provider may also generate comparisons, such as graphs, for subsets of the feedback data. This may enable the content provider to efficiently analyze a large volume of feedback data.

A feedback module as described herein may determine feedback scores for each of the discrete segments. For example, a feedback score may be associated with a particular beat of a screenplay identified by the writer. Feedback scores may be thought of as a measure that may represent two or more commentators' assessments of a segment. The feedback may be aggregated for each segment into a raw feedback score. An adjusted feedback score may also be computed that accounts for one or more of a variety of factors when computing a feedback score. For example, a measure of commentator reputation may be used to assign a greater weight to feedback that may be more likely to be helpful in computing the adjusted feedback score. Feedback may also be filtered according to criteria selected by a user of the mass content feedback tool. This may create targeted feedback scores and/or comparisons of feedback from different subsets of commentators who have provided feedback. The targeted feedback scores may represent, for example, feedback from a specific demographic of commentators, as identified by information associated with each of the individual commentators. In this way, the content provider may obtain feedback from a selected subset of commentators, such as women, commentators over the age of 30, or commentators interested in horror movies.

In another aspect of the mass content feedback tool, users may evaluate feedback for helpfulness. For example, a content provider may give a thumbs up to a helpful comment and they may give a thumbs down for a comment that is not helpful. Similarly, commentators may also view the feedback obtained by the mass feedback tool associated with each segment of the work and evaluate the feedback provided by other commentators. Evaluation of a commentator's feedback may be used to determine a reputation score for the commentator. The reputation score may be thought of as a measure of the commentator's helpfulness. The reputation score may be based on, for example, one or more of a content provider's evaluation of the commentator's feedback, another commentator's evaluation of the commentator's feedback, and/or a correlation with feedback provided by another commentator. Other information may be factored into the reputation score. As another example, a prominent writer may be assigned a strong reputation score. One or more reputation scores may be used in aggregating and/or filtering feedback. In some instances, feedback scores may be weighted by reputations scores. In other instances, only feedback provided by commentators with reputation scores that satisfy a threshold may be presented to a content provider.

The mass content feedback tool described herein may facilitate the democratization of works, such as films and novels. Such a tool may be a core functionality of a community site that may bring together a number of people, such as content creators, editors, critics, and/or fans. Any combination of features of the mass content feedback tool described herein may also be integrated into existing social networking services. For instance, writers and filmmakers may connect via the mass content feedback tool. As another example, fans may become more involved in the creation of works. In some instances, entire works may be created based to a large extent on feedback provided by commentators. Using the mass content feedback tool, feedback may be obtained from a large audience and incorporated into a work.

Figure 1:
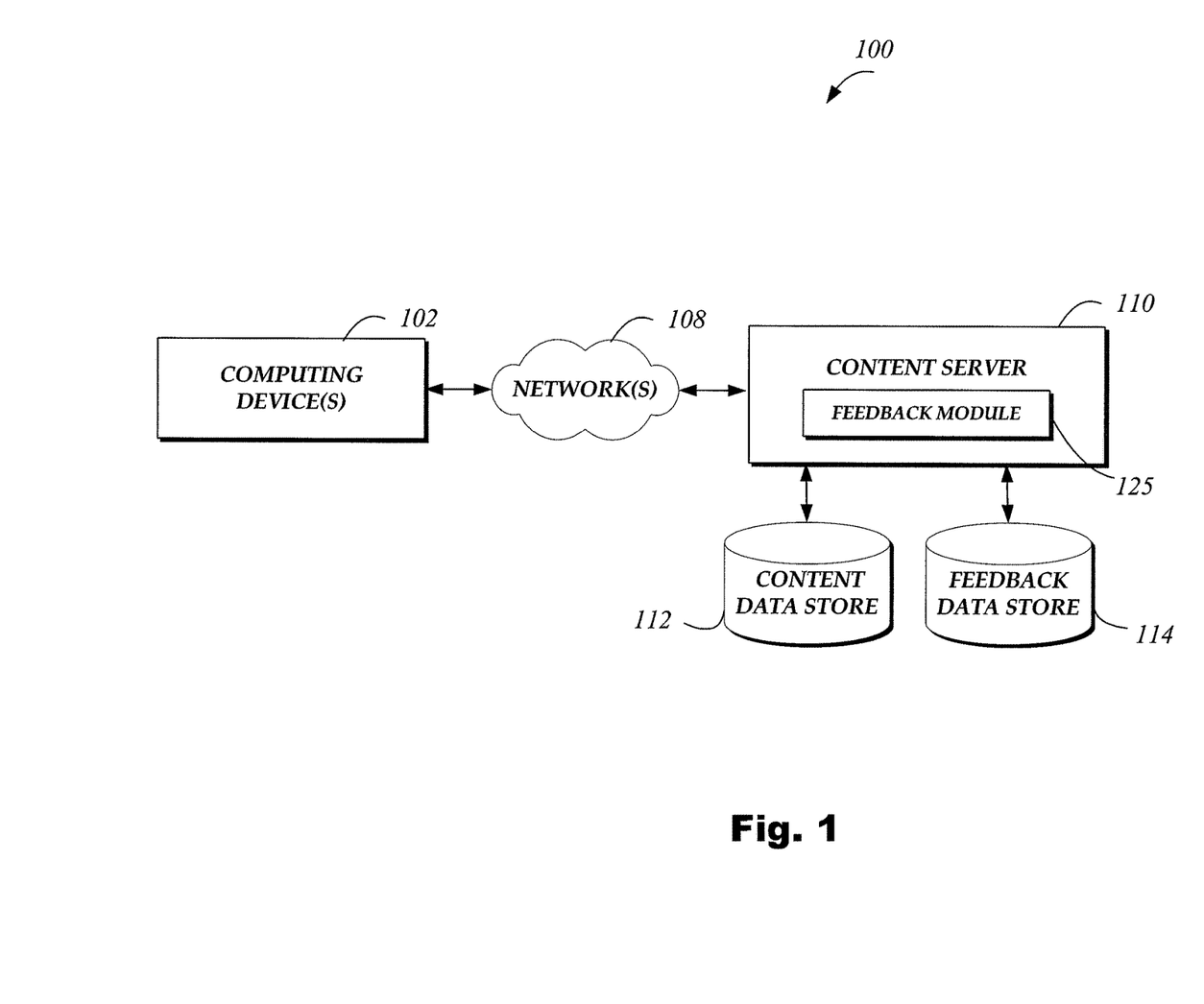
FIG. 1 is a block diagram depicting an illustrative operating environment including a content server for obtaining and providing feedback for discrete segments of a work.

The illustrative operating environment shown in FIG. 1 includes a system 100 in which users may provide content that includes a work divided into discrete segments, as well as provide feedback associated with the discrete segments. The system may be referred to generally as a mass content feedback tool. The system 100 may include a content server 110 that includes a feedback module 125 for determining one or more feedback scores for each discrete segment of a work. The content server 110 may also facilitate electronic browsing of content and/or feedback using various user devices, such as computing device 102. The computing device 102 may be any of a number of computing devices that are capable of communicating over a network including, but not limited to, a laptop, personal computer, a tablet computer, personal digital assistant (PDA), hybrid PDA/mobile phone, mobile phone, electronic book reader, digital media player, and the like.

The content server 110, which will be described below in more detail, may be connected to or in communication with a content data store 112 that stores content information. The content information may include text, data, sound recordings, photographs and images, video, software, or other forms of content corresponding to a work. Each work may include multiple segments, with each segment including a part of the work. The discrete segments may be of varying granularity, as described later in more detail. In addition, at least one discrete segment may not overlap with any of the other discrete segments. This may allow a content provider to obtain only one set of feedback that is associated with any portion of the non-overlapping segment. The content data store 112 may also store information associated with a work for which segment specific feedback is obtained. Content data stored in content data store 112 may include, but is not limited to, any information related to a work that may be of interest to a user or may be useful for classifying the work. For example, content data may include, but is not limited to, title, content creator, type of content, content identifier, content image, content description, information associated with segments of a work, etc.

The content server 110 may also be connected to or in communication with a feedback data store 114 that stores feedback information, which may include commentator ratings, commentator comments, commentator reputation, commentator demographics, feedback associated with specific segments of a work, an aggregated feedback score associated with specific segments of a work, an adjusted feedback score associated with specific segments of a work, etc.

In different embodiments, the content data store 112 and/or the feedback data store 114 may be local to content server 110, may be remote from the content server 110 and/or may be a network-based service itself. In other embodiments, the content data store 112 and the feedback data store 114 may be implemented in a single data store. In the environment shown in FIG. 1, a user of the system 100 may utilize the computing device 102 to communicate with the content server 110 via one or more communication networks 108, such as the Internet or any other suitable communications link operative to enable the computing device 102 to communicate with the content server 110. The network 108 may be any wired network, wireless network or combination thereof. In addition, the network 108 may be a personal area network, local area network, wide area network, cable network, satellite network, cellular telephone network, etc. or any combination thereof. Protocols and components for communicating via the Internet or any of the other aforementioned types of communication networks are well known to those skilled in the art of computer communications and, thus, need not be described in more detail herein.

The system 100 is depicted in FIG. 1 as operating in a distributed computer environment comprising several computer systems that are interconnected using one or more computer networks. The system 100 could also operate within a computer system having more or less components than are illustrated in FIG. 1. Thus, the depiction of system 100 in FIG. 1 should be taken as illustrative and not limiting to the present disclosure. For example, the system 100 could implement various Web services components and peer-to-peer network configurations to implement at least a portion of the processes.

In brief, the content server 110 is generally operative to provide front-end communication with various user devices, such as the computing device 102, via the network 108. The front-end communication provided by the content server 110 may include generating text and/or graphics, possibly organized as a user interface using hypertext transfer or other protocols in response to information obtained from the various user devices. The content server 110 may obtain information associated with discrete segments of a work from one or more additional data stores (not illustrated), as is done in conventional networked systems. In certain embodiments, the content server 110 may also access item data from other data sources, either internal or external to system 100.

Figure 2:
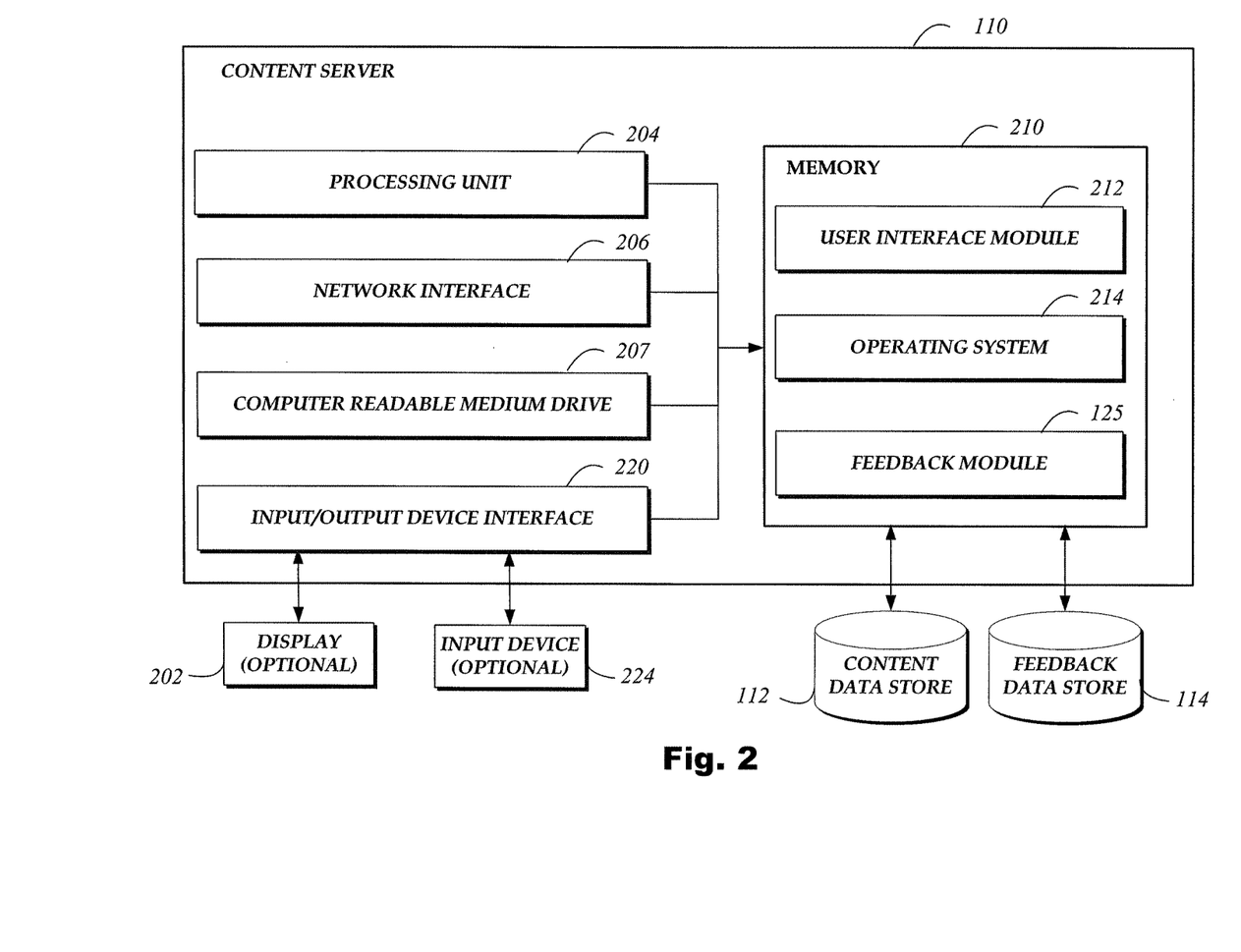
FIG. 2 depicts an example of a general architecture of a content server, including a feedback module for generating feedback scores for discrete segments of a work.

FIG. 2 depicts an example of a general architecture of a content server 110 for providing discrete segments of a work and/or obtaining feedback associated with the discrete segments of the work. The general architecture of the content server 110 depicted in FIG. 2 includes an arrangement of computer hardware and software components that may be used to implement aspects of the present disclosure. The content server 110 may include more or fewer components than those shown in FIG. 2. It is not necessary, however, that all of these generally conventional components be shown in order to provide an enabling disclosure. As illustrated, the content server 110 includes a network interface 206, a processing unit 204, an input/output device interface 220, an optional display 202, an optional input device 224, and a computer readable medium drive 207, all of which may communicate with one another by way of, for example, a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc.

The memory 210 contains computer program instructions that the processing unit 204 executes in order to implement one or more embodiments. The memory 210 generally includes RAM, ROM and/or other persistent or non-transitory memory. The memory 210 may store an operating system 214 that provides computer program instructions for use by the processing unit 204 in the general administration and operation of the content server 110. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a browser application installed on the computing device. In addition, memory 210 may include or communicate with one or more auxiliary data stores, such as the content data store 112 and the feedback data store 114.

In addition to the user interface module 212, the memory 210 may include a feedback module 125 that may be executed by the processing unit 204. In one embodiment, the feedback module 125 implements various aspects of the present disclosure, e.g., generating segment specific feedback scores. While the feedback module 125 is shown in FIG. 2 as part of the content server 110, in other embodiments, all or a portion of a feedback module may be a part of another server. For example, in certain embodiments of the present disclosure, another server may include several components that operate similarly to the components illustrated as part of the content server 110, including a user interface module, a feedback module, a processing unit, a computer readable medium drive, etc. In such embodiments, the other server may communicate with a content data store and/or a feedback data store, such as the content data store 112 and the feedback data store 114.

Figure 3:
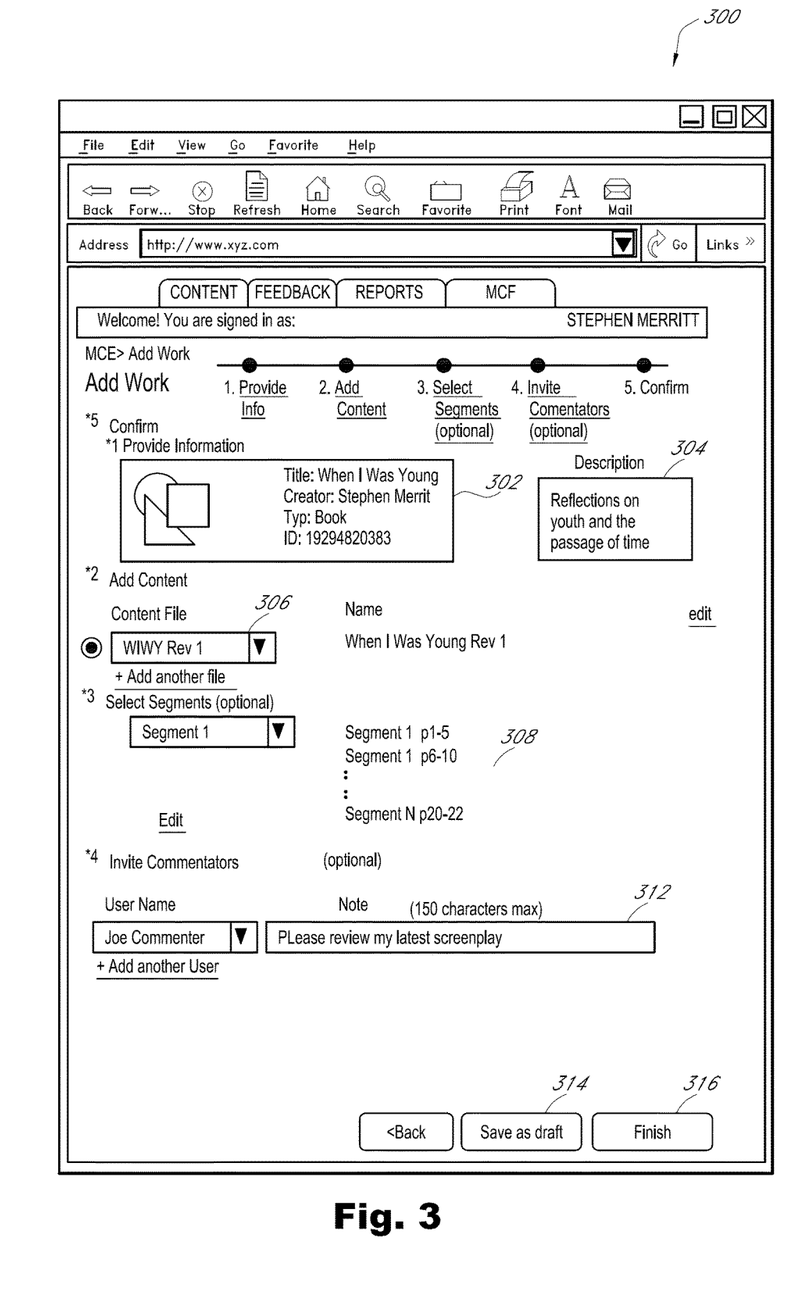
FIG. 3 is an illustrative user interface generated by the content server that includes options for a content provider to add a work to the mass content feedback tool.

FIG. 3 is an illustrative user interface 300 generated by the content server that includes options for a content provider to add at least a portion of a work to the mass content feedback tool. Like each of the user interfaces described herein, the user interface 300 may be viewed on a user device, such as the computing device 102, which communicates with the content server 110 via the network 108. The illustrated user interface 300 provides confirmation of information supplied by a content provider before the content provider submits a work to the mass content feedback tool.

As shown in FIG. 3, a content provider may begin the process of submitting at least a portion of a work to the mass content feedback tool by providing information about the work 302. The information about the work 302 may include, but is not limited to, title, content creator, type of content, and/or content identifier (ID). This information may be used to organize and/or search for works in the mass content feedback tool. A description of the work 304 may also be provided. Such information may be selected or entered by the content provider using any suitable means known in the art. The description 304 may be presented to potential commentators in order to interest them in providing feedback on the work.

A work or a portion of a work may be represented by one or more content files 306. A content file 306 may be added to the mass content feedback tool from a computing device 102 via the user interface 300. At least a portion of the content file 306 may be transferred over a network 108 and stored in the content data store 112. In other instances, content files may be accessed from one or more computing devices 102 of one or more user of the mass content feedback tool. The work may include a complete unit of content, which may include without limitation text, data, sound recordings, video, and/or software. For example, as illustrated, the work may be a book that is represented by a content file that includes text.

In addition, the work may be divided into discrete segments 308, in order to obtain granular feedback on specific portions of the work. For example, a segment may represent a scene of a story. As described earlier, the discrete segments may represent different portions of the work, such as beats, scenes, chapters, etc. Discrete segments of the work may represent only a portion of the work. At least one of the discrete segments may not overlap with any of the other discrete segments. For example, only one discrete segment may include any portion of a particular beat of a screenplay. Alternatively or additionally, at least one of the discrete segments may overlap with at least a portion of another discrete segment. For example, one discrete segment of a screenplay may include a beat that is part of a scene, which is included in another discrete segment. All of the discrete segments associated with a work may only include a portion of the work. In other instances, all of the discrete segments include the entire work.

In one embodiment, discrete segments are identified at the direction of the content provider. Alternatively or additionally, the content server 110 may automatically identify discrete segments of a work without direction from the content provider. In some instances, another user of the mass content feedback tool may identify discrete segments of the work.

In some embodiments, the content provider may select discrete segments of the work from one or more content files 306, for example, via the third stage of adding a work to the mass content feedback tool shown in FIG. 3. Selecting segments may be accomplished in a number of ways. For example, one or more segments may be stored in separate content files. As another example, a segment may be identified as a discrete portion of a content file, such as by line and/or pages numbers for text files (as illustrated in FIG. 3) or a certain time range for audio and/or video files.

In other embodiments, the mass content feedback tool may algorithmically identify discrete segments of the work. For example, text files may be searched for breaks in the text that indicate new paragraphs, sections, chapters, or other natural dividing points in the text, and then the text may be divided into segments. As another example, transitions in sound may be used to identify different segments in content files with an audio component. As yet another example, changes in imagery may be determined and used to divide content files with visual components into segments. Alternatively or additionally, changes in sentiment may be algorithmically identified in any type of content and subsequently used to divide a work into segments, for example, via computer instructions executed by the content server 110.

The content provider may also invite one or more commentators to provide feedback on one or more segments of the work via the user interface 300. For example, the content provider may select a commentator, search for a commentator, and/or enter a user name of the commentator, in order to invite the commentator to provide feedback on one or more segments of the work. In other instances, the content provider may simply provide content information, such as an email address, in order to invite a commentator. The content provider may also send a note 312 along with the invitation.

The content provider may then confirm that she wants to add a work to the mass content feedback tool, for example, by clicking on a finish button 314. Any of the information provided in the submission process may be edited from the user interface 300. In addition, the submission may be saved as a draft for adding the work at a later time, for example, by clicking on a save as draft button 316.

Once a work has been added to the content server 110, one or more segments of the work may be accessed by commentators. For example, a commentator may access a beat of a screenplay. Each commentator may provide feedback associated with one or more specific segments of the work. In some embodiments, a commentator may create a user profile that includes a variety of information about the commentator. The information provided by the commentator may be useful for filtering the feedback, as will be described later in connection with FIGS. 9 and 10. In addition to using information in the user profile for filtering feedback scores and other feedback data, information in the user profile may be used to identify certain users as potential commentators for certain segments of a work. For example, certain users may be suggested to content providers and/or the content server may automatically invite certain users to comment on particular works or segments of works based on any of the information associated with the user profile. Although the user profile is described in connection with a commentator, a user profile may alternatively or additionally be associated with a content provider or any other user of the mass content feedback tool.

Figure 4:
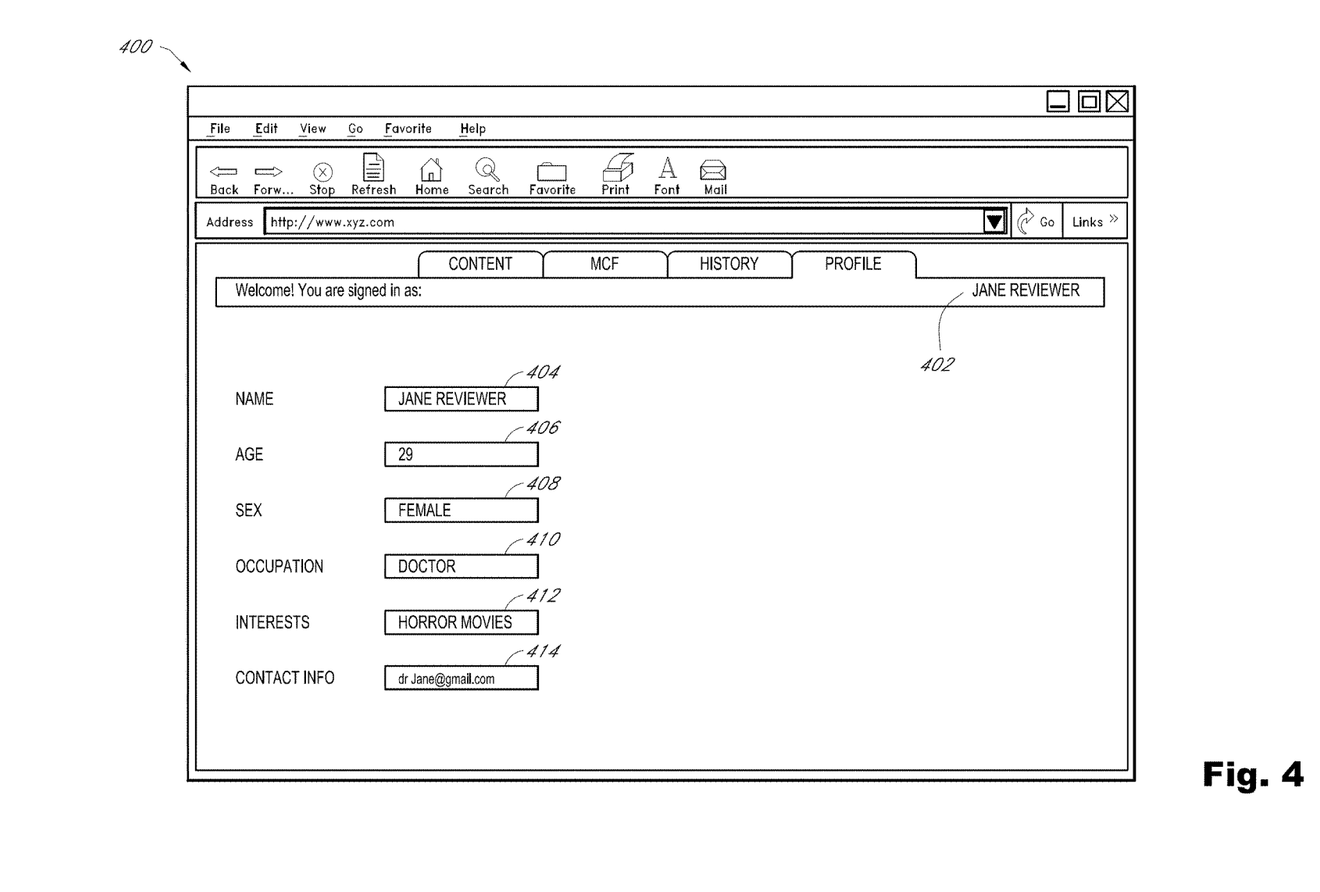
FIG. 4 is an illustrative user interface generated by the content server that allows a commentator to create a user profile.

FIG. 4 is an illustrative user interface 400 generated by the content server 110 that allows a commentator 402 to create a user profile. The commentator 402 may be anyone who provides feedback on a segment of a work via the mass content feedback tool. For example, other content creators, editors, critics, and/or fans may be commentators. The commentator 402 may provide a wide variety of information via the user interface 400 including, but not limited to, name 404, age 406, sex 408, occupation 410, interests 412, and/or contact information 414. Beyond information provided by the commentator 402, the content server 110 may also associate additional information with the user profile. For example, one or more of information regarding activity level of a commentator, commentator reputation, and commentator history may be automatically associated with the user profile via the mass content feedback tool.

In some embodiments, user profiles may be viewed by other users of the mass content feedback tool. Privacy settings may be provided to allow users to restrict access to at least a portion of their user profile. Sharing information associated with a user profile may facilitate networking between users that share common interests or other common attributes. Beyond sharing contact information, the mass content feedback tool may include a messaging service for users to communicate with each other. Allowing other users to view a user profile may also enable a content provider to identify certain users who she would like to provide feedback on her work.

Figure 5:
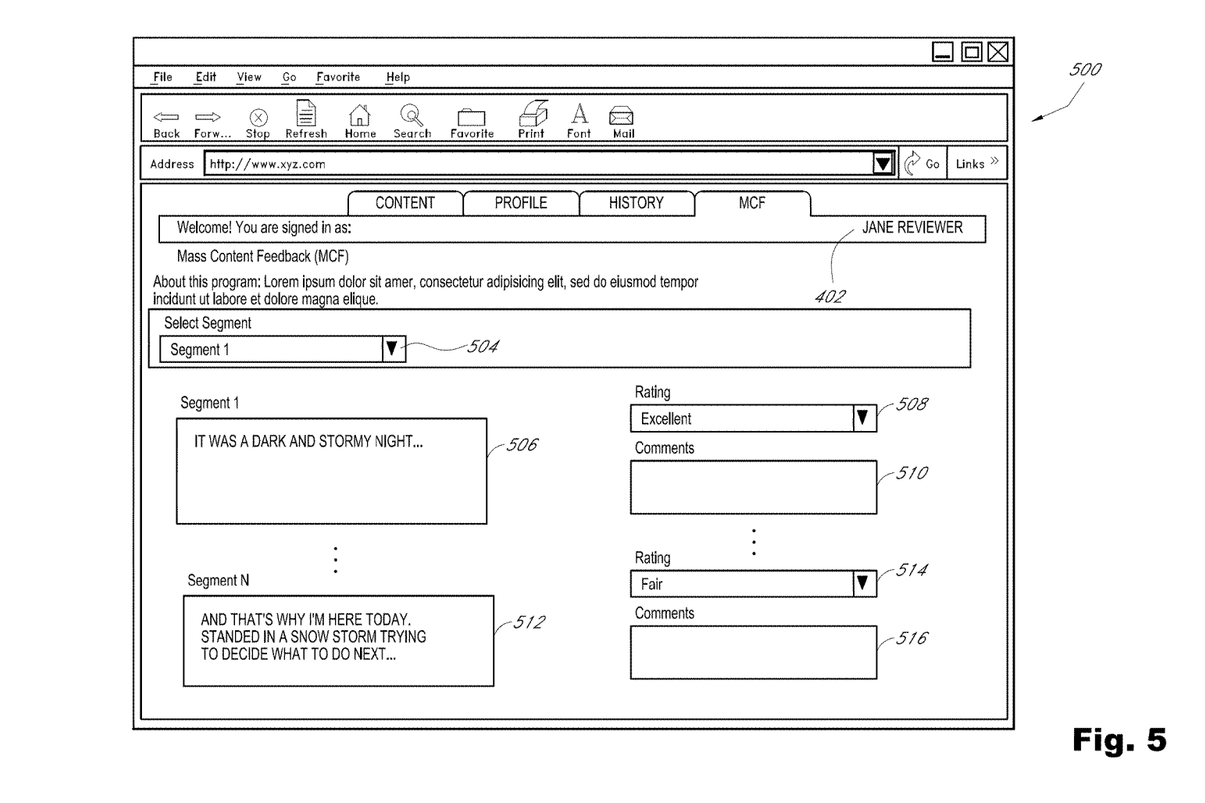
FIG. 5 is an illustrative user interface generated by the content server that enables a commentator to provide feedback on discrete segments of a work.

The commentator 402 may send an invitation to provide feedback from a content provider or an invitation automatically generated by the mass content feedback tool. Alternatively or additionally, the commentator 402 may browse available works and segments thereof via the mass content feedback tool and select one or more segments for which to leave feedback. FIG. 5 is an illustrative user interface 500 generated by the content server 110 that enables the commentator 402 to provide feedback on discrete segments of a work.

As illustrated, the user interface 500 enables the commentator 402 to select one or more segments of a work via a selection element 504. Any suitable selection element may be used, for example, a drop-down menu may be used. After making a selection, the commentator may access the selected segment(s) and provide feedback specific to the selected segment(s). In the illustrated example, user interface 500 presents portions of a book to potential commentators. The user interface 500 may provide the selected one or more segments 506, 512 of the book to the commentator 402, along with an associated rating element 508, 514 and an associated comment element 510, 516. In this way, the commentator 402 may provide feedback associated with a particular segment in the form of a rating and/or verbal comments. As a result, the commentator 402 may provide both a rating of the general impression of the particular segment and specific comments regarding the segment. The rating may be either qualitative or quantitative. The rating may be on a number of different scales, depending on how the user interface 500 is implemented. For example, the commentator may rate a segment on a qualitative scale that includes "fair" and "excellent," as shown in FIG. 5. As another example, the commentator may rate a segment on a scale of 1 to 10. In some instances, ratings may be negative values for negative comments and positive values for positive comments. In some embodiments, the rating may be as simple as a binary thumbs up or thumbs down. The comments may provide any message that the commentator wishes to express concerning the segment. This may provide content providers with information not easily be captured in a rating. For example, comments may include information about particular features of the segment that the commentator liked or disliked and/or suggestions as to how to revise the segment. Some comments may be textual. These comments may be entered as text via comment elements 510, 516. Other comments may include audio and/or video components.

Figure 6:
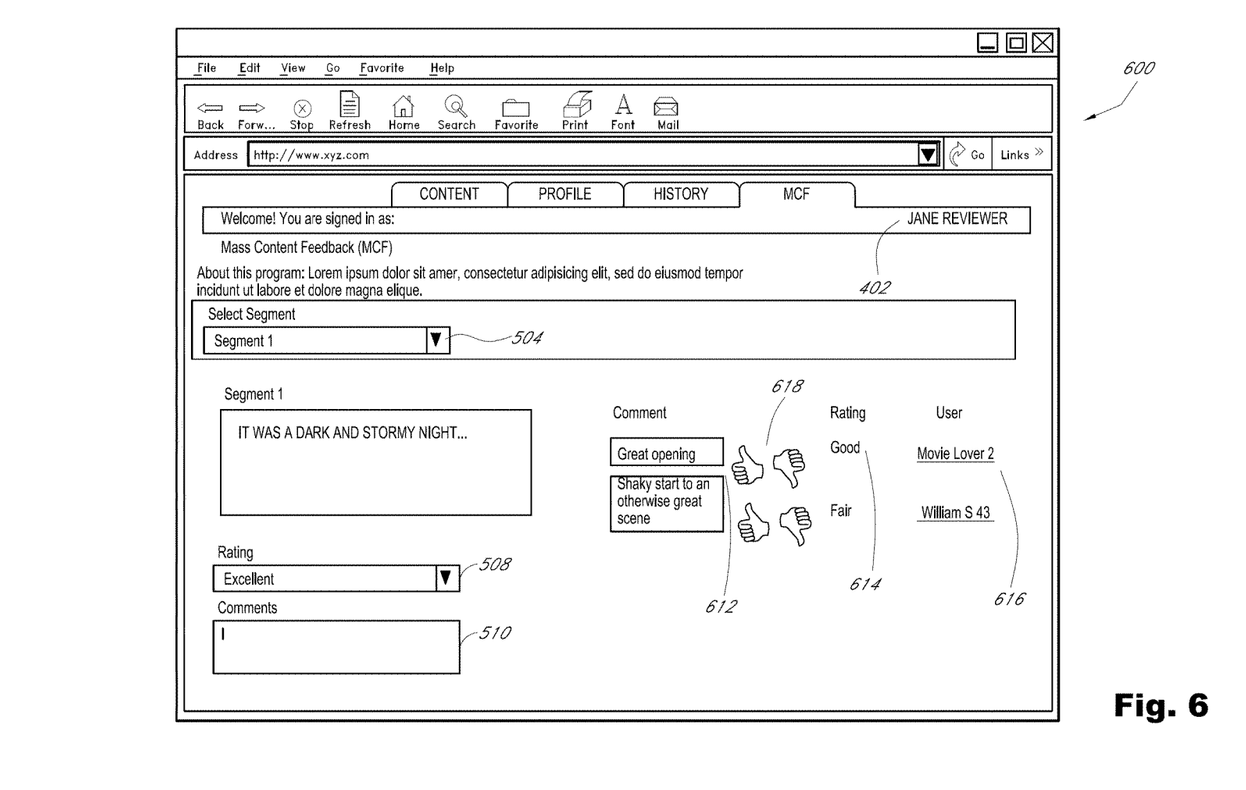
FIG. 6 is an illustrative user interface generated by the content server that enables a commentator to provide feedback on a discrete segment of a work and to view feedback provided by other commentators for the discrete segment.

FIG. 6 is another illustrative user interface 600 generated by the content server 110 that enables the commentator 402 to provide feedback on a discrete segment of a work and to view feedback provided by other commentators for the discrete segment. While the description of FIG. 6 may refer to one discrete segment, each of the features described in connection with this figure may apply to two or more discrete segments and their associated feedback. As illustrated, the user interface 600 includes a number of features that are also included in the user interface 500 of FIG. 5, such as a selection element 504, a selected segment 506, a rating element 508, and a comment element 510. The user interface 600 may also include feedback associated with the selected segment 506 provided by other commentators, such as comments 612 and ratings 614.

The user interface 600 may also show a user name 616 associated with certain feedback. This may enable the commentator to look up the user profile associated with the user name 616 to view information associated with that user. For example, the commentator may click on a hypertext link or look up the user and decide to network with the user. As another example, the commentator may look up other segments for which the user has provided feedback and then access those segments. In some embodiments, a reputation score associated with the user, as described in more detail in connection with FIG. 8, may also be displayed by the user interface 600.

The commentator 402 may also evaluate the feedback associated with the selected segment provided by other users via the user interface 600. The evaluation may be associated with comments 612, ratings 614, other feedback, or any combination thereof. As shown, evaluation elements 618 allow the commentator 402 to provide either a positive or a negative evaluation of the feedback. In other embodiments, evaluation elements may allow the commentator 402 to provide evaluation of other commentator's feedback that includes ratings and/or comments. The evaluation provided by evaluation elements 618 may be accessed by a commentator and/or a content provider via a user interface. Alternatively or additionally, the evaluation may be used to determine a reputation score associated with a particular commentator, as will be described in more detail in connection with FIG. 8.

Data obtained by the content server 110 via one or more user interfaces, such as the illustrative user interfaces provided in FIGS. 3-6, may be stored in one or more data stores, such as content data store 112 and feedback data store 114. This data may be used by the feedback module 125 to compute segment specific feedback scores, commentator reputation scores, and/or other metrics of interest to a content provider. The computed scores may help content providers analyze granular feedback about specific segments of a work, determine which segments are well liked, and focus on particular segments to revise. In some instances, the computed scores may be used to select one of two or more alternative segments to include in a work. For example, a content provider may add at least two different endings to a screenplay, and the ending with the highest computed score may be included in the screenplay while the alternative endings may be discarded. In certain instances, at least a portion of a work may be created based on which of a number of alternative segments obtains the most favorable computed feedback score, thereby democratizing the creation process.

Figure 7:
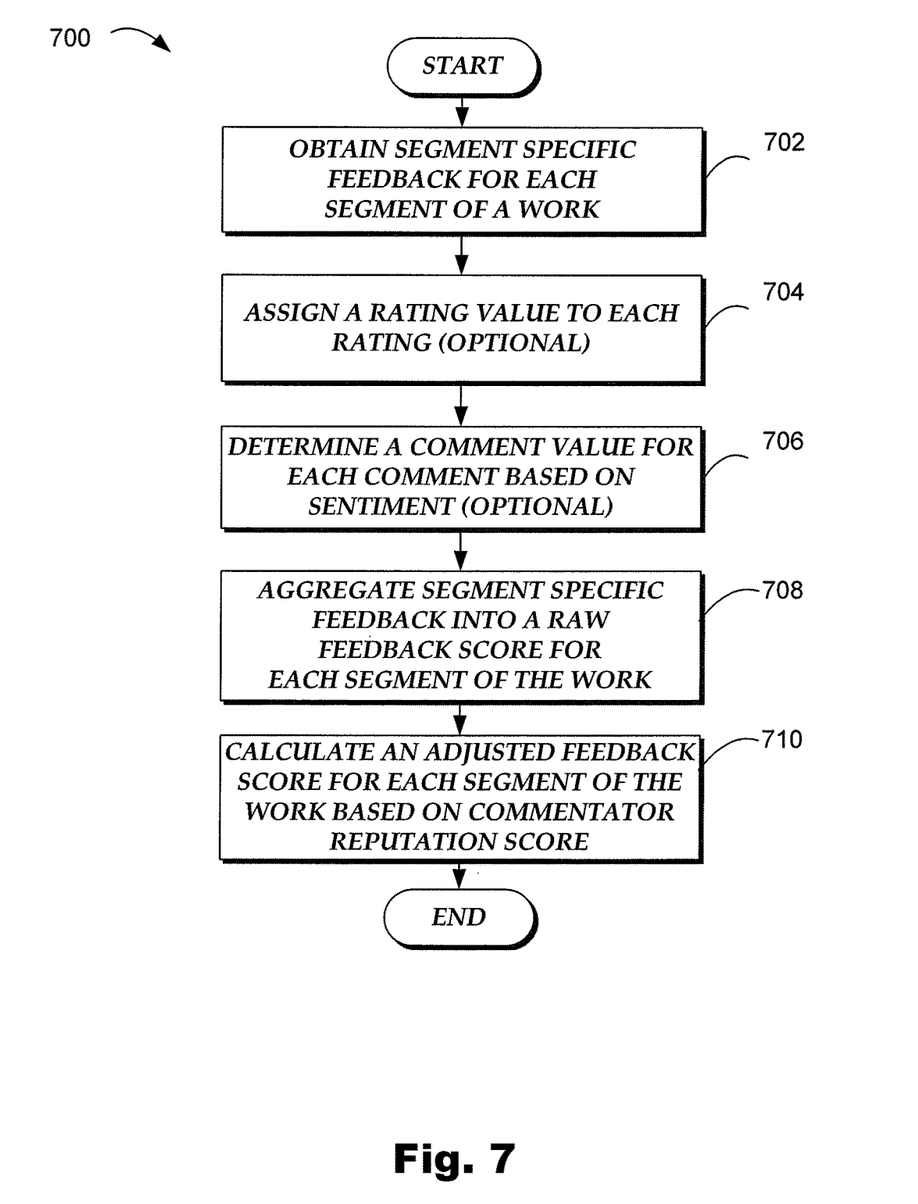
FIG. 7 is a flow diagram of an illustrative method implemented by the feedback module for generating feedback scores for discrete segments of a work.

FIG. 7 is a flow diagram of an illustrative method 700 implemented by the feedback module 125 to generate one or more feedback scores for discrete segments of a work. The feedback scores may be used by content providers to evaluate discrete segments of a work and identify which segments may be edited in order to achieve the greatest impact. The illustrative method 700 may be implemented to determine an aggregated feedback score for each segment of a work, which may be used, for example, to compare commentator ratings for each segment of the work. In some embodiments, the method 700 may dynamically update one or more feedback scores as new feedback is obtained. Alternatively, the method 700 may update one or more feedback scores at set intervals of time including, but not limited to, hourly, daily, weekly, and the like. While certain feedback scores will be discussed below as associated with a rating and/or comment provided by a commentator, in some embodiments, feedback may broadly encompass any evaluation provided by a commentator associated with a segment of a work. In addition, although feedback scores discussed below may be numerical, feedback scores may be qualitative or include a qualitative component along with a numerical component, in certain embodiments. For example, feedback may be aggregated into a score on a scale that includes scores such as "poor," "fair," "good," and "excellent."

As illustrated in FIG. 7, the method begins at block 702, where the feedback module 125 obtains segment specific feedback for each segment of a work. For example, a commentator may provide feedback via a user interface generated by the content server 110. Such a user interface may include any combination of features described earlier in connection with FIGS. 5 and 6.

The segment specific feedback may include a rating and/or a comment associated with a particular segment of a work, for example, as described earlier in connection with FIGS. 5 and 6. In certain embodiments, a rating value is assigned to each rating at block 704. The rating value may be any measure of a commentator's rating. For example, the rating value may simply be the rating provided by a commentator. Alternatively, the rating value may represent a translation of the rating provided by a commentator to a different scale. For example, a rating of "good" may be scaled to a value of 7 out of 10.

In some embodiments, a comment value is assigned to each comment at block 706. The comment value may be any measure assigned to a comment provided by a commentator. For example, the feedback module 125 may analyze the sentiment of a comment provided by a commentator. Sentiment analysis may include a broad range of natural language processing, computational linguistics and/or text mining techniques that generally aim to determine the attitude of the commentator to a specific segment of a work. For example, an "excited" sentiment in a comment may indicate the commentator's feedback is positive for a specific segment of a work, and thus should be assigned a higher comment value. In some embodiments, however, a generally negative sentiment in a relatively high percentage of comments associated with a segment of a work may still indicate a high interest in an associated segment, leading to a higher comment value. For example, if the segment is about a controversial subject or a tragic outcome, a strong reaction may occur that includes comments with negative sentiment due to the nature of the subject or because the segment evokes a strong commentator reaction, but nonetheless reflects positive feedback.

At block 708, the feedback module 125 may aggregate segment specific feedback into a raw feedback score for each segment of the work. For example, once the feedback module 125 determines the feedback score for feedback provided by each commentator associated with a given segment, the feedback module 125 may aggregate feedback scores of all commentators associated with the given segment into one raw feedback score. The raw feedback score may represent an average measure (e.g., mean, median, mode) of feedback for each segment of a work. The raw feedback score may be based on ratings and/or comments provided by commentators. When the raw feedback score is based on both ratings and comments, the rating values and the comments values may be combined. This may include normalizing and/or weighting the rating values and the comment values. The raw feedback score may be provided to the content provider via a user interface displayed on a user device, for example, as illustrated in the example user interfaces provided in FIGS. 9 and 10.

The feedback module may also calculate an adjusted feedback score for each segment of the work based on commentator reputation score at block 710. The commentator reputation score may represent the helpfulness of a commentator, as will be described in more detail in connection with FIG. 8. A measure of each segment specific feedback may be weighted by the commentator reputation score, in calculating an adjusted feedback score. This may provide a metric that may be of greater interest to a content provider. In some instances, a content provider may provide her own weights to comments provided by the commentators. Additional sorting and filtering of the segment specific feedback may be performed automatically or at the direction of a user, as will be described later in connection with FIGS. 9 and 10.

Figure 8:
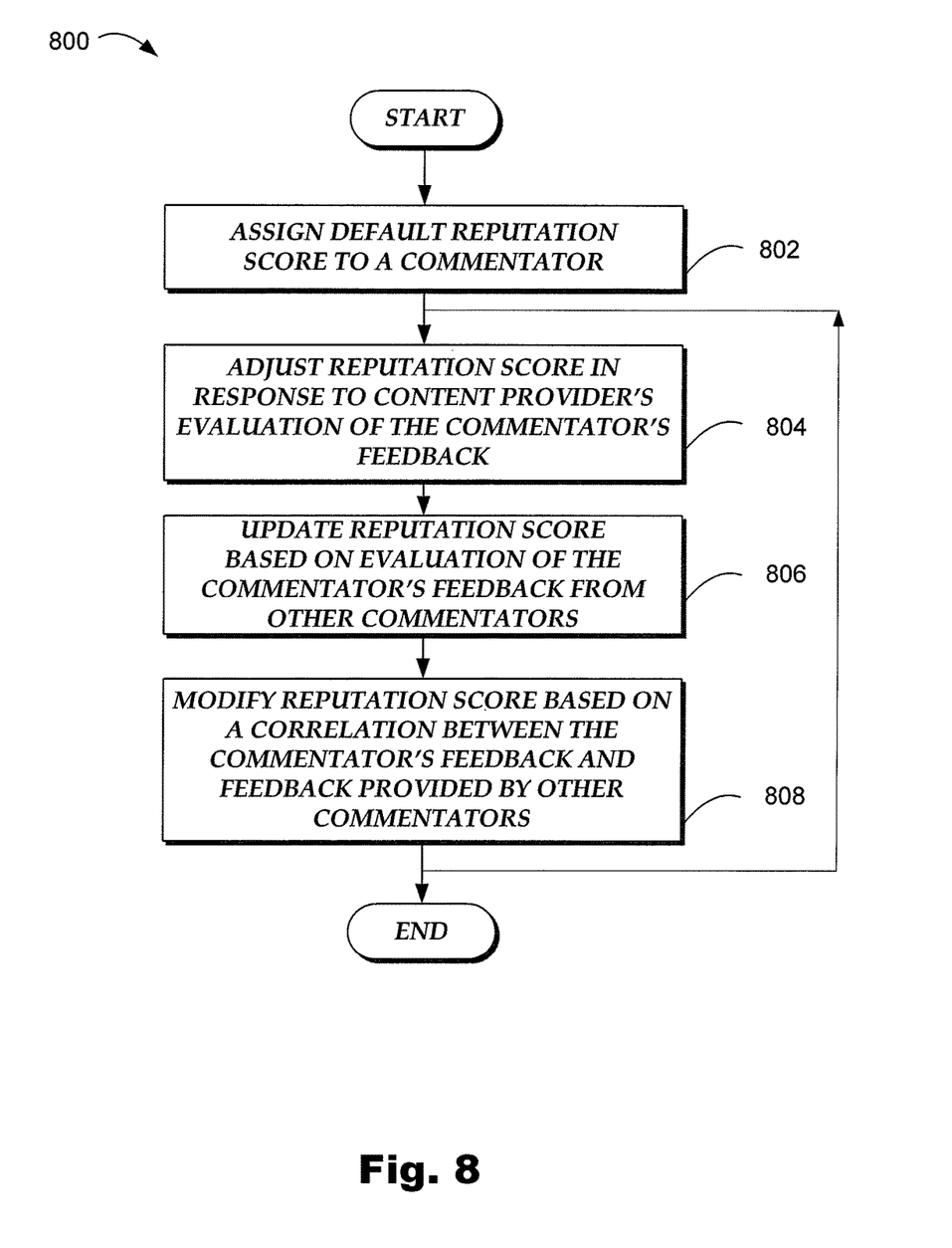
FIG. 8 is a flow diagram of an illustrative method implemented by the feedback module for generating a reputation score for a commentator.

FIG. 8 is a flow diagram of an illustrative method 800 implemented by the feedback module 125 to generate a reputation score associated with a commentator. The reputation score may be used, for example, at block 710 of the process 700 to calculate an adjusted feedback score. Reputation scores may also be used to filter feedback scores and/or to invite specific commentators to provide feedback on one or more segments of a work.

In some embodiments, the method 800 may dynamically adjust a commentator reputation score as the commentator provides new feedback and/or another commentator evaluates the commentator's feedback. Alternatively, the method 800 may update the commentator reputation score at set intervals of time including, but not limited to, hourly, daily, weekly, and the like. In certain embodiments, the reputation score may be updated both dynamically and at set intervals of time. For example, each time another commentator evaluates the commentator's feedback, the commentator's reputation score may be updated and at set periods of time, the feedback module 125 may correlate commentator feedback associated with each commentator and update the commentator's reputation score.

The method 800 begins at block 802 by assigning a default reputation score to a commentator. The default reputation score may later be adjusted, for example, based on an evaluation of commentator feedback by a content provider, an evaluation of commentator feedback by one or more other commentators, and/or a correlation of commentator feedback with feedback provided by other commentators. In some embodiments, the default reputation score may represent an average helpfulness. In other embodiments, the default reputation score may represent a baseline score that is adjusted up or down based on evaluation of commentator feedback.

The feedback module 125 may adjust the reputation score in response to a content provider's evaluation of the commentator's feedback at block 804. Such an adjustment to the reputation score may allow a content provider to identify which feedback is useful. The content provider may evaluate feedback via a drop-down menu, textual entry, clicking on a thumbs up or thumbs down icon, or any suitable element for obtaining feedback. More detail regarding a content provider evaluating feedback will be described in connection with FIGS. 9 and 10. The reputation score may be adjusted based on how positive the content provider's evaluation is. For example, the more positive the evaluation of the feedback, the more positive the reputation score becomes. This may result in an increase in the reputation score where a higher reputation score represents a better reputation. The reputation score may be adjusted based on a number of mathematical relationships, for example, it may be adjusted linearly, exponentially, etc. in relation to the content provider's evaluation.

Another way that the commentator's reputation score may be updated is based on one or more other commentators' evaluation of the commentator's feedback at block 806. Any of the examples of a commentator evaluating feedback described earlier in connection with FIG. 6 may be taken into account. The reputation score may be updated in a similar fashion to how the reputation score is adjusted based on the content provider's evaluation of the commentator's feedback. Alternatively, either the content provider's evaluation or the other commentator's evaluation may be given more weight in changing the reputation score. In some embodiments, the update to the commentator's reputation score may be based on a reputation score associated with another commentator who evaluates the commentator's feedback. For example, an evaluation by a second commentator with a reputation score indicative of a better reputation may be weighted more heavily than an evaluation by a third commentator with a reputation score indicative of a less desirable reputation.

The feedback module 125 may also modify the commentator's reputation score based on a correlation between the commentator's feedback and feedback provided by other commentators at block 808. The correlation may modify the reputation score based on a number of relationships, such as modifying the commentator's reputation score to be closer to a reputation score of another commentator who has left similar feedback, modifying the commentator's reputation score in response to a reputation score of another commentator who has left similar feedback being adjusted at block 804 or being updated at block 806. The feedback module 125 may repeat the operations of blocks 804 to 808 continually or at set periods of time.

Figure 9:
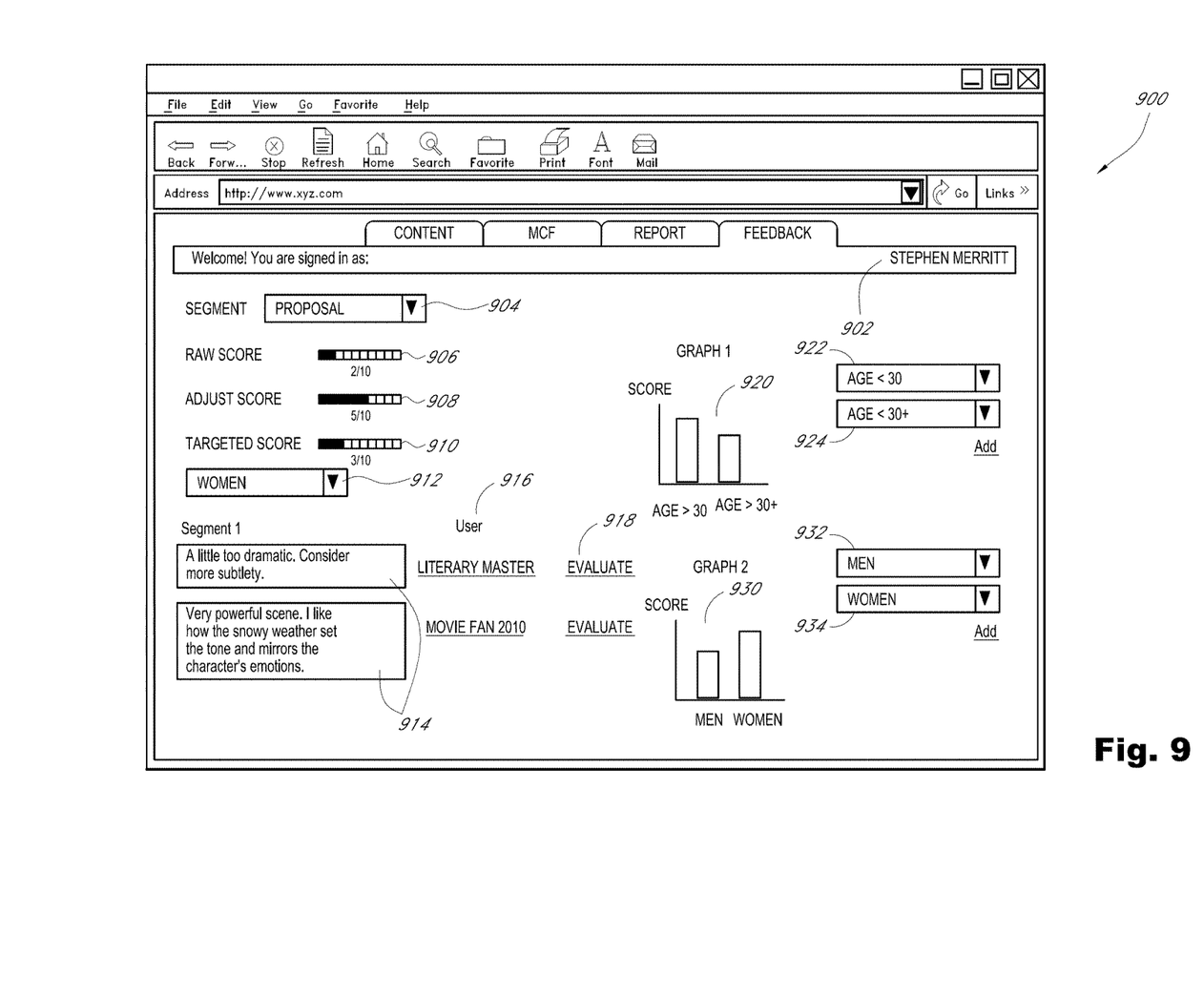
FIG. 9 is an illustrative user interface generated by the content server that displays segment specific feedback to a content provider.

The mass content feedback tool may provide feedback scores, which may take into account commentator reputation scores, to a content provider. FIG. 9 is an illustrative user interface 900 generated by the content server 110 that enables a content provider 902 to select a particular segment 904 of a work and view feedback information associated with the particular segment 904 of the work. As illustrated, the user interface 900 is displayed via a browser application operating on a computing device, such as computing device 102, utilized by a user. As shown, the user interface 900 includes a raw feedback score 902 and an adjusted feedback score 904, both of which may be determined, for example, by the method 700 of FIG. 7. In other embodiments, any user of the system 100 may use the user interface 900 via a user device, such as computing device 102.

The user interface 900 may also provide the content provider with a number of options to sort and/or filter feedback data based on selected criteria, which may be selected via a selection element, entered by a user in a text box and searched, etc. For example, a targeted score 910 may be based on a demographic criteria 912 selected by the content provider 902. Demographic criteria 912 may include any information used to classify users into groups. Such information may include without limitation information provided by a commentator, for example, via the interface 400 and/or information associated with a commentator, such as a reputation score. The demographic criteria 912 may be used to determine a subset of feedback data from which to determine the targeted feedback score 910. Then the targeted feedback score 910 may be determined by the feedback module 125 using any combination of features described in connection with the method 700, applied to feedback provided by commentators with attributes that correspond to the demographic criteria 912.

The content provider 902 may view comments 914 associated with the particular content segment 904. The user interface 900 may also provide a user name 916 associated with each comment and an evaluation element to evaluate the feedback, such as comments 914, provided by a commentator. While the illustrated evaluation element 918 is a hyperlink, a number of other evaluation elements may be used that are capable of obtaining an evaluation from the content provider 902.

The user interface 900 may also allow a commentator 902 to generate graphs 920, 930 to provide a graphical representation of filtered feedback scores. For example, the content provider may select two or more user comparison demographic criteria 922, 924, 932, 934 to generate graphs 920, 930 based on target demographics selected by the content provider. Comparisons, such as graphs 920, 930, may be generated via the user interface 900 based on any information provided by commentators as part of their user profiles. Such information may include any of the information described earlier in connection with FIG. 4. In some embodiments, commentators may be divided into demographic groups based on a value associated with a certain type of information. For example, age may be a type of information and the user comparison demographics 922, 924 may divide commentators into groups with an age value in one or more ranges of ages. In some embodiments, the comparisons may simply include providing two or more feedback scores via the user interface.

While feedback data shown in FIG. 9 is presented for display to a content provider, in some embodiments, feedback data may have a variety of other applications. For example, feedback data may be used by the content server 110 to invite commentators to provide feedback on one or more segments of a work. As another example, the content server 110 may notify one or more content providers of feedback activity and/or changes in feedback scores for one or more segments. Additionally, any combination of the features of the user interface 900 may be incorporated into a user interface for a commentator, such as the user interface 600 of FIG. 6.

Figure 10:
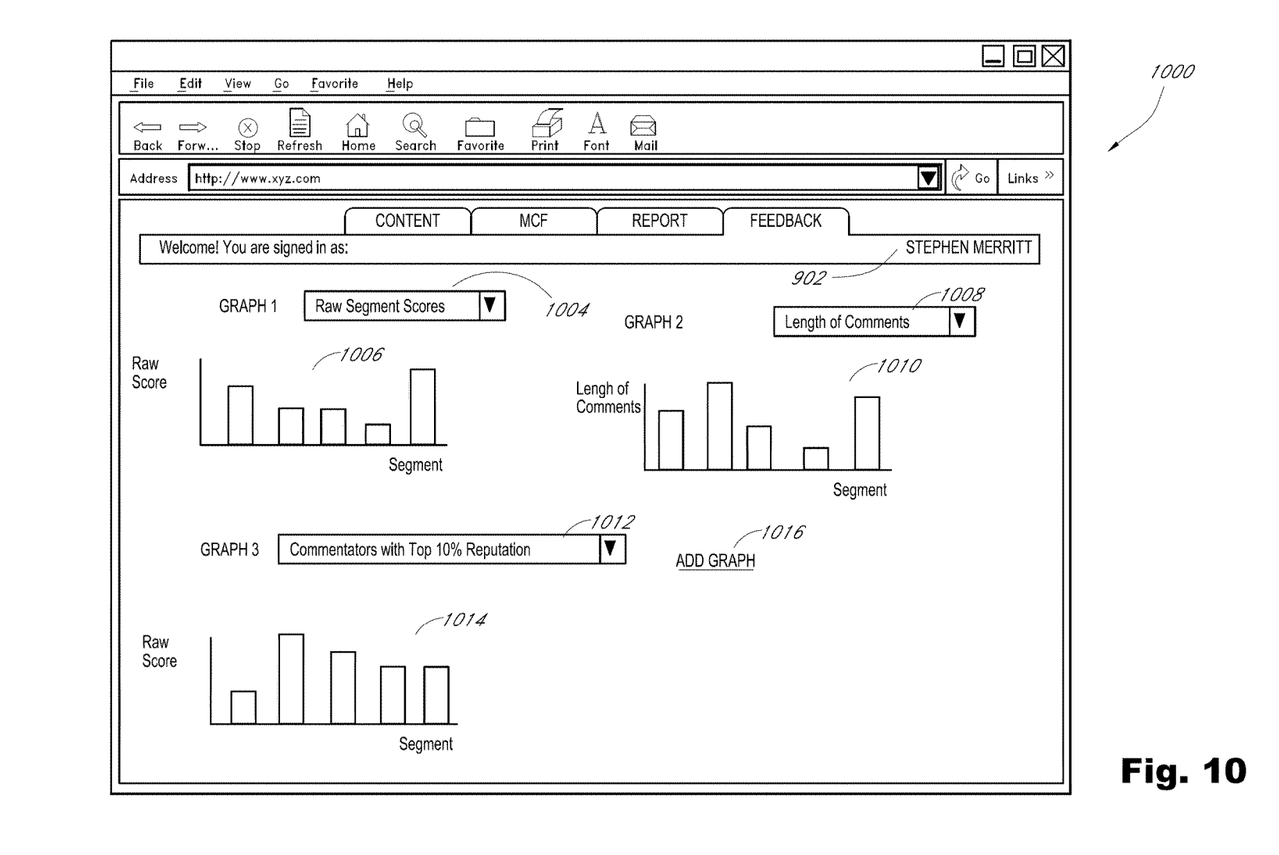
FIG. 10 is an illustrative user interface generated by the content server that displays a report including feedback for a plurality of segments of a work.

FIG. 10 is an illustrative user interface 1000 generated by the content server 110 that enables a content provider 1002 to generate comparisons of two or more segment specific feedback scores and/or other feedback data associated with two or more segments of a work. In some embodiments, comparisons may compare data associated with each of the identified segments associated with a work. Providing comparisons of feedback scores may help a content provider to determine which segments of a work are well liked and which segments of the work could be improved to the make the work stronger. In this way, trends may be identified and the relative strengths and weaknesses of specific segments may be determined, thereby providing the content provider 1002 with granular feedback. While FIG. 10 is described in connection with a content provider, any combination of features of the user interface 1000 may be available to any user of the system 100 via a user device, such as computing device 102.

A user may generate comparisons based on a number of options. While three examples are provided, any combination of the data referenced herein may be used to generate comparisons, such as the graphs illustrated in FIG. 10. For example, a content provider 1002 may select a score filter 1004 to generate a comparison 1006 that compares a subset of the scores generated, for example, by the method 700 of FIG. 7, among two or more segments of a work. In this example, raw scores, adjusted scores, targeted scores, and the like may be selected by the user. As another example, feedback data 1008 may be used to generate a comparison 1010 that compares the selected feedback data 1008 among two or more segments of a work. In contrast to a feedback score, the feedback data 1008 may include any other data associated with a particular segment of a work. As illustrated, feedback data may include the length of comments provided by a commentator. As yet another example, the user interface 1000 may enable the content provider 1002 to select a demographic filter 1012 to generate comparison 1014 based on a subset of commentators. Although raw feedback scores are illustrated in the comparison 1014, any of the computed feedback scores may be selected by the content provider to generate a comparison. In addition, the user interface 1000 may enable the content 1002 to generate additional graphs, for example, via a hyperlink 1016 or any suitable means.

Once a content provider has viewed and analyzed feedback, there are a number of options as to how to proceed. The content provider may decide that the work is not in need of revision based on positive feedback scores. Alternatively, the content provider may decide that the work needs to be revised and identify particular segments of a work for revision. For example, one or more beats of a screenplay with lower relative feedback scores compared to other beats may be identified as segments of the screenplay to revise. The content provider may then repost the revised segments of the work to the mass content feedback tool. The content provider may simply wait for new feedback on the newly posted portions of the work. Alternatively or additionally, the content provider may invite one or more commentators to provide feedback on segments of the work corresponding to the revised portions. New feedback scores may then be compared to previous feedback scores, for example, using user interfaces similar to the example user interfaces 900, 1000 illustrated in FIGS. 9 and 10. This may allow the content provider to see whether commentators view one or more of revised segments as an improvement or a step in the wrong direction compared to one or more previous versions of the one or more revised segments. The content provider may iterate any portion of this process as desired.

In some embodiments, feedback data, such as feedback scores, may be used to create at least a portion of a work. At least two alternative segments may be added to the mass content feedback tool, and the segment from among these alternative segments with the most favorable feedback may be selected for inclusion in the work while the other alternative segments are not included. Such a process may be repeated for two or more groups of alternative segments. The alternative segments may be presented for feedback concurrently or sequentially. While the alternative segments may be added by a single content provider, two or more content providers may add alternative segments for inclusion in the same work. Based any combination of these methods for choosing among alternative segments, the users of the mass content feedback tool may collectively create a work based on aggregated feedback. For example, a collaborative screenplay may be created based on selecting beats and/or scenes with the most favorable segment specific feedback from at least two choices for each included beat and/or scene.

A wide variety of information may be obtained from a plurality of users of the mass content feedback tool. In some instances, the mass content feedback tool may include a prediction engine, which may be implemented, for example, by the content server 110. The prediction engine may use any combination of the data collected by the mass content feedback tool to make a prediction about a work added to the mass content feedback tool. The mass content feedback tool may use one or more correlations to generate a prediction based on empirical data. The empirical data may include without limitation information provided by users to the mass content feedback tool and/or information actively collected by the mass content feedback tool, for instance, information related to a work collected by a network crawler implemented by the feedback module 125. The one or more correlations may be stored, for example, in the feedback data store 114. A prediction may be about the commercial success of a movie or a book. For example, if empirical data indicates that a screenplay with a strong beginning, a weak middle, and a strong ending is likely to be a commercial success, then the prediction engine may predict that a work with similar characteristics will also be a commercial success. As another example, if empirical data indicates that a book with an ending that has high ratings from commentators in a particular demographic group is likely to sell at least a certain number of copies, then the prediction engine may predict that another book with similar ratings by the particular demographic group will also sell a similar number of copies.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing feedback on discrete segments of an individual work, the system comprising:
   a data store configured to store feedback data associated with discrete segments of the individual work; and
   one or more computer systems in communication with the data store, wherein the one or more computer systems are configured to:
   algorithmically identify two or more discrete segments of the individual work from which to obtain segment specific feedback;
   obtain segment specific feedback for alternative discrete segments of a portion of the individual work, the alternative discrete segments being different versions of the portion of the individual work;
   store feedback data for each of the alternative discrete segments in the data store;
   calculate a feedback score for each of the alternative discrete segments of the work based at least in part on at least one commentator reputation score associated with a commentator; and
   provide a user with access to the calculated feedback scores for at least one of the alternative discrete segments.

2. The system of claim 1, wherein the individual work comprises a written story, and wherein the discrete segments comprise text.

3. The system of claim 1, wherein the one or more computer systems are further configured to aggregate segment specific feedback into a raw feedback score for the alternative discrete segments of the individual work based at least in part on the stored feedback data.

4. The system of claim 1, wherein the commentator reputation score is based at least in part on one or more of an evaluation of commentator feedback and a correlation with feedback provided by another commentator.

5. The system of claim 1, wherein the calculated feedback score for at least one of the alternative discrete segments is based at least in part on feedback that includes a rating and a comment.

6. A system for providing feedback on discrete segments of an individual work, the system comprising:
   a data store configured to store feedback data associated with discrete segments of the individual work; and
   one or more computer systems in communication with the data store, wherein the one or more computer systems are configured to:
   obtain segment specific feedback for alternative discrete segments of a portion of the individual work, the alternative discrete segments being different versions of the portion of the individual work;
store feedback data for each of the alternative discrete segments in the data store;
calculate a feedback score for each of the alternative discrete segments of the work based at least in part on at least one commentator reputation score associated with a commentator;
provide a user with access to the calculated feedback scores for at least one of the alternative discrete segments; and
obtain segment specific feedback for discrete segments of the individual work, wherein the discrete segments of the individual work have a different granularity.

7. The system of claim 6, wherein the one or more computer systems are further configured to:
cause presentation of an entire alternative discrete segment of the alternative discrete segments via a user interface so as to enable the commentator to consume the entire alternative discrete segment; and
enable the commentator to provide segment specific feedback for the alternative discrete segment via the user interface.

8. The system of claim 7, wherein the one or more computer systems are further configured to enable the commentator to provide segment specific feedback for the alternative discrete segment via the user interface while the alternative discrete segment is being presented via the user interface.

9. The system of claim 8, wherein the one or more computer systems are configured to cause concurrent presentation of content of the alternative discrete segments to the commentator.

10. The system of claim 6, wherein the individual work is divided into two or more discrete segments at the direction of a content provider.

11. The system of claim 6, wherein the one or more configured computer systems are further configured to generate a comparison of at least two of the calculated feedback scores based at least in part on a filter selected by the user.

12. The system of claim 6, wherein the alternative discrete segments correspond to alternative endings of the individual work.

13. The system of claim 6, wherein the one or more computer systems are further configured to cause presentation of a comparison of the calculated feedback scores associated with different alternative discrete segments of the alternative discrete segments of the individual work to the user.

14. A computer-implemented method of comprising:
as implemented by one or more computing devices configured with specific executable instructions,
computing feedback scores associated with pre-defined alternative segments of an individual unfinished work, the pre-defined alternative segments being alternative versions of a portion of the individual unfinished work, wherein each of the pre-defined alternative segments represents one of a beat, a scene or a chapter;
generating a comparison of the computed feedback scores associated with the pre-defined alternative segments based at least in part on demographic criteria that divide commentators who provide feedback into groups; and
providing data indicative of the comparison to a computing device to present to a user.

15. The computer-implemented method of claim 14, further comprising:
causing presentation of an entire pre-defined alternative segment of the pre-defined alternative segments of the individual unfinished work via a user interface so as to enable a commentator to consume the entire pre-defined alternative segment;
enabling the commentator to provide segment specific feedback for the pre-defined alternative segment via the user interface; and
receiving the segment specific feedback from the commentator.

16. The computer-implemented method of claim 14, wherein at least one of the feedback scores is based at least in part on a commentator reputation score associated with a commentator who provided feedback for at least one of the pre-defined alternative segments.

17. The computer-implemented method of claim 14, further comprising causing presentation, to the user on the computing device, of at least two of a raw feedback score, an adjusted feedback score representing a weighted version of feedback, and a targeted feedback score representing feedback associated with a subset of the commentators who provided feedback.

18. The computer-implemented method of claim 14, wherein the demographic criteria is based at least in part on one or more of age, sex, occupation, and interests.

19. The computer-implemented method of claim 14, wherein the demographic criteria is based at least in part on at least one reputation score associated with a commentator.

20. The computer-implemented method of claim 14, wherein the generating is based at least in part on demographic criteria selected at the direction of the user.

21. The computer-implemented method of claim 14, wherein the groups comprise at least a first group and a second group, and wherein the comparison comprises comparing a first representation of a plurality of feedback scores associated with the first group of commentators and a second representation of a plurality of feedback scores associated with the second group of commentators.

* * * * *